United States Patent [19]

Mason

[11] Patent Number: 4,459,340

[45] Date of Patent: Jul. 10, 1984

[54] METHOD FOR PRODUCING ELECTRICITY FROM A FUEL CELL HAVING SOLID-OXIDE IONIC ELECTROLYTE

[75] Inventor: David M. Mason, Los Altos, Calif.

[73] Assignee: Board of Trustees, Stanford University, Stanford, Calif.

[21] Appl. No.: 373,759

[22] Filed: Apr. 30, 1982

[51] Int. Cl.³ .............................................. H01M 8/00
[52] U.S. Cl. ........................................ 429/13; 429/33
[58] Field of Search ................... 429/13, 30–33, 429/46

[56] References Cited

U.S. PATENT DOCUMENTS

| | | | |
|---|---|---|---|
| 3,219,730 | 11/1965 | Bliton et al. | 429/30 X |
| 3,300,344 | 1/1967 | Bray et al. | 429/33 |
| 3,429,749 | 2/1969 | Baukal | 429/31 |
| 3,981,746 | 9/1976 | Bezaudun et al. | 429/13 |
| 4,078,119 | 3/1978 | Katz et al. | 429/13 |
| 4,242,421 | 12/1980 | Kudo et al. | 429/13 |
| 4,248,941 | 2/1981 | Louis et al. | 429/13 |

Primary Examiner—Charles F. LeFevour
Attorney, Agent, or Firm—Bertram I. Rowland

[57] ABSTRACT

Stabilized quadrivalent cation oxide electrolytes are employed in fuel cells at elevated temperatures with a carbon and/or hydrogen containing fuel anode and an oxygen cathode. The fuel cell is operated at elevated temperatures with conductive metallic coatings as electrodes and desirably having the electrolyte surface blackened. Of particular interest as the quadrivalent oxide is zirconia.

14 Claims, 3 Drawing Figures

SCHEMATIC DIAGRAM OF SOLID-ELECTROLYTE DISC FUEL-CELL SYSTEM

SCHEMATIC DIAGRAM OF SOLID-ELECTROLYTE DISC FUEL-CELL SYSTEM

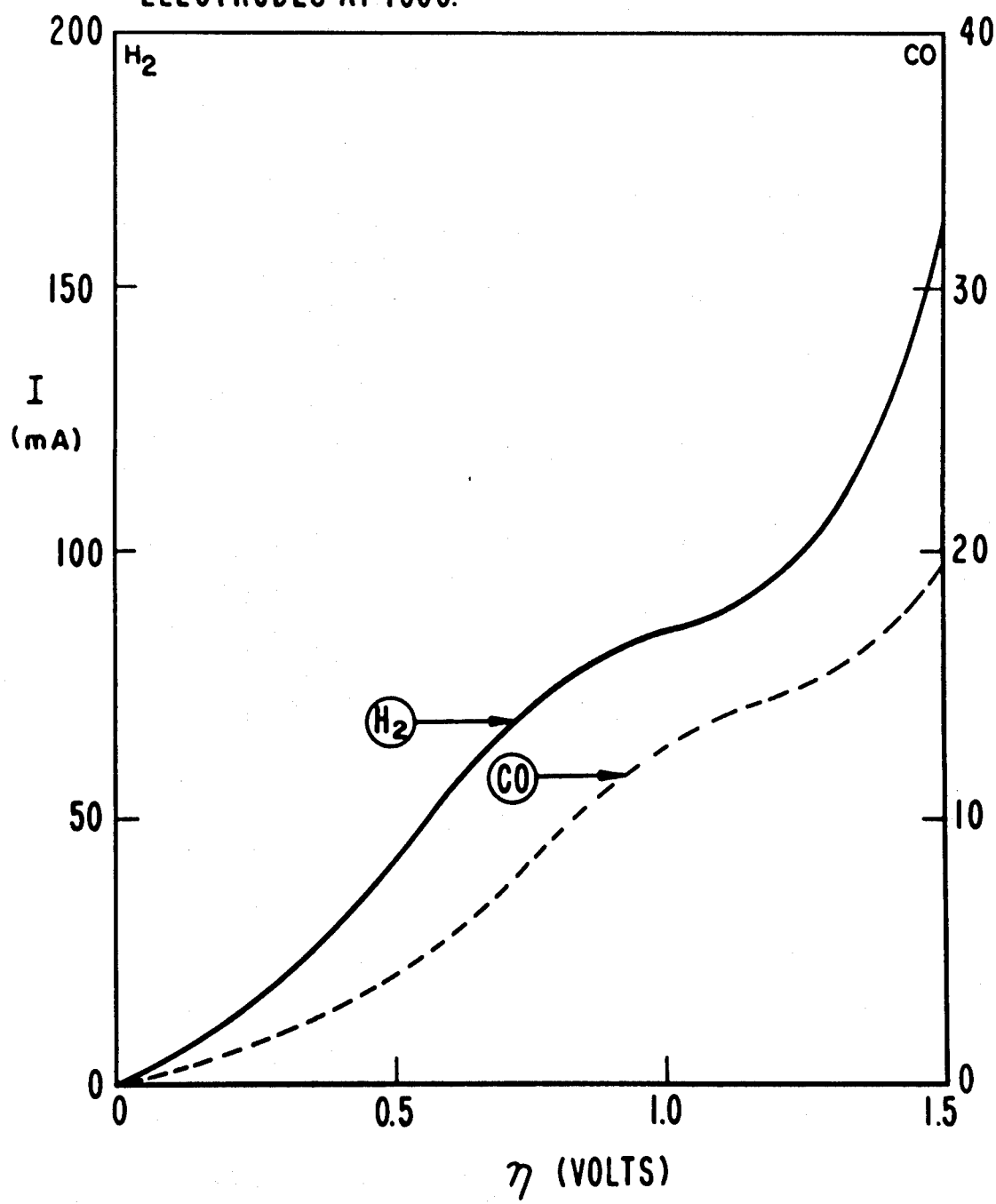

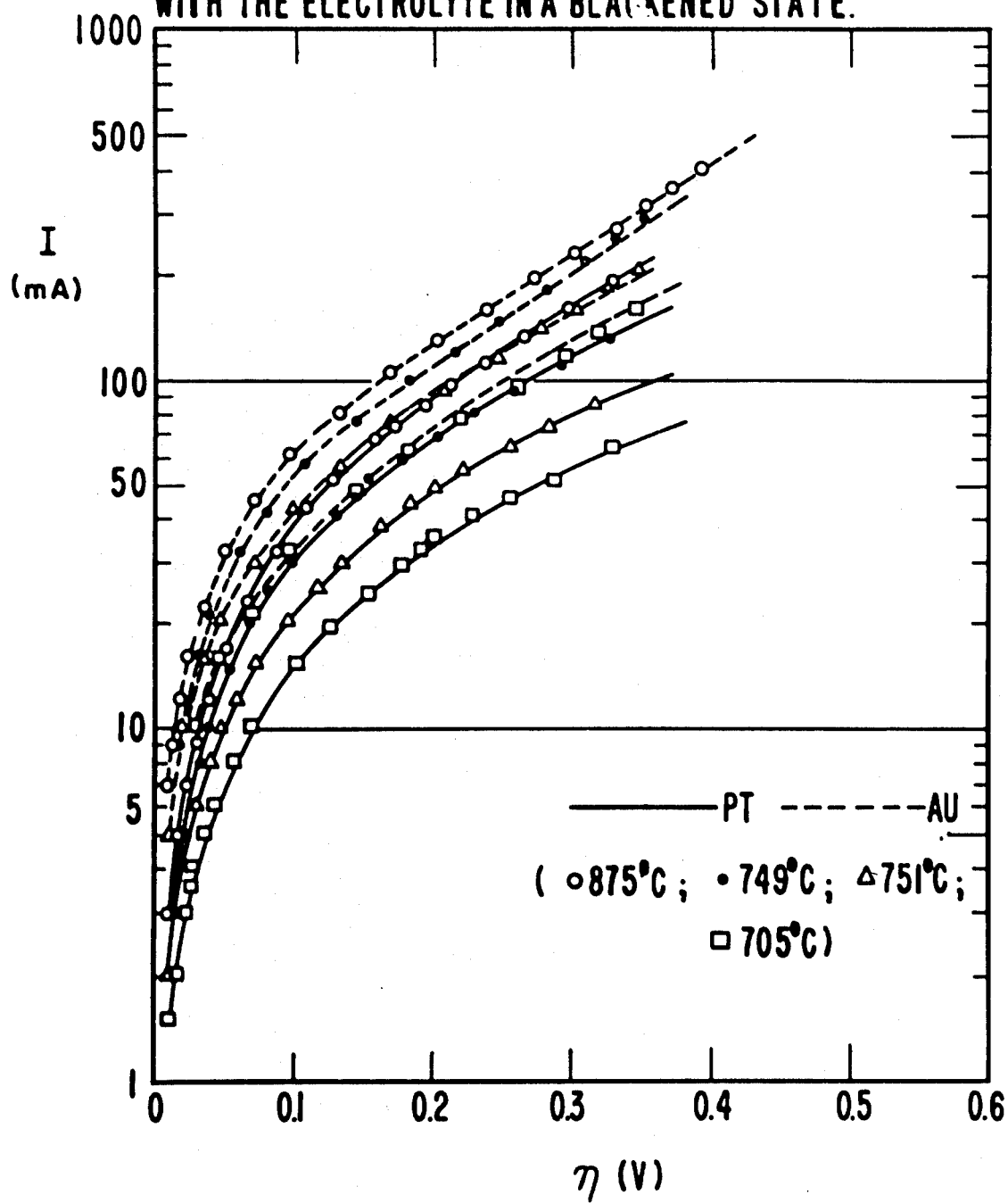

METHOD FOR PRODUCING ELECTRICITY FROM A FUEL CELL HAVING SOLID-OXIDE IONIC ELECTROLYTE

BACKGROUND OF THE INVENTION

1. Field of the Invention

As the distribution of available fossil fuels changes, different approaches to the generation of electricity become of increasing interest. One of the potential sources for electricity is fuel cells. While fuel cells employing solid-oxide electrolytes have many attractive features, a major drawback is the high operating temperature required. At the high temperatures, constituent materials have limited lifetimes. The materials tend to diffuse into each other destroying their integrity and function.

Furthermore, in developing fuel cells, it is desirable to have complete utilization of the fuel, so that the effluent is free of any fuel value. Also, one wishes to have the greatest proportion of the theoretical energy resulting from the oxidation of the fuel to a final product converted to electrical energy, rather than dissipating energy as unrecoverable heat. However in some instances, the fuel cell may be employed for producing an intermediate product as well as electricity.

It is therefore desirable to develop new fuel cells having improved properties in operating condition, efficiency of fuel utilization, and efficiency of transformation of the energy resulting from the reaction into electrical energy, as well as providing reduced costs.

2. Description of the Prior Art

Nernst, Z. Electrochem. (1900) 6:41 reported the electrolytic evolution of oxygen from a solid zirconia-yttria composition. A summary of the solid-state chemistry of stabilized zirconia is provided by Kofstad, *Non-stoichiometry, Diffusion and Electrical Conductivity in Binary Metal Oxide*, Wiley-Interscience (1972), pp. 160–165.

The electrical properties of solid oxide electrolytes is presented by Etsell and Flengas, "The Electrical Properties of Solid Oxide Electrolytes," Chem. Rev. (1970) 70:339-376. The conductivities of several stabilized-zirconia electrolytes as a function of temperature may be found in Nasrallah and Douglas, J. Electrochem. Soc. (1975) 121:255-262, while the conductivity relationship for other oxide systems may be found in U.S. Pat. No. 3,607,424 and Ross and Benjamin, "Thermal Efficiency of Solid Electrolyte Fuel Cells With Mixed Conduction" (United Technologies Research Center, East Hartford, Conn. 06108).

Electrochemical studies on solid electrolytes were the subject of the following seminars: National Fuel Cell Seminar, July 11–13, 1978, Hotel Regency, San Francisco, Calif.; National Fuel Cell Seminar, July 14-16, 1980, San Diego, Calif.; "Third International Meeting on Solid Electrolytes-Solid State Ionics and Galvanic Cells," Sept. 15-19, 1980, Tokyo, Japan.

Weissbart and Ruka, J. Electrochem. Soc. (1962) 109:723 investigated current-over potential behavior in hydrocarbon systems. Pancharatnam, et al. J. Electrochem. Soc. (1975) 122:869-875 describe the electrolytic dissociation of nitrogen oxide on scandia-stabilized electrolytes. Wen and Mason, J. Appl. Electrochem. (1978) 8:81-85 describe the role of scandia-stabilized zirconia electrolyte in electrocatalytic processes. Goffe and Mason, J. Appl. Electrochem. (1981) 11:447-452 describe the use of scandia-stabilized zirconia for the electro-oxidation of hydrocarbon fuels derived from coal, operating at 700° C. and one atm. Ong, et al., Solid State Ionics (1981) 3/4:447-452 describe the electrocatalytic role of stabilized zirconia on the anodic current-overpotential behavior in hydrocarbon fuel cells.

SUMMARY OF THE INVENTION

Stabilized fluorite structured quadrivalent oxide electrolytes are employed in fuel cells as catalytic solid electrolytes in conjunction with metallic electrodes and hydrogen and/or carbon-containing fuels, particularly fuels derived from fossil fuel sources. Particularly, yttria or scandia-stabilized zirconia are used in conjunction with a gaseous fuel at the anode and oxygen at the cathode at temperatures exceeding about 600° C. By employing a plurality of fuel cells, voltages of 110 volts can be achieved with efficient current production.

BRIEF DESCRIPTION OF THE FIGURES

FIG. 2 is a graph of overpotential vs. current for the electrocatalytic behavior of gases on scandia stabilized zirconia electrolyte with porous Pt or Au electrodes at 700° C.; and FIG. 3 is a graph of current vs. overpotential for an air-CO fuel cell anode using Pt or Au porous electrodes with the electrolyte in the blackened state.

DESCRIPTION OF THE SPECIFIC EMBODIMENT

Figure 1:
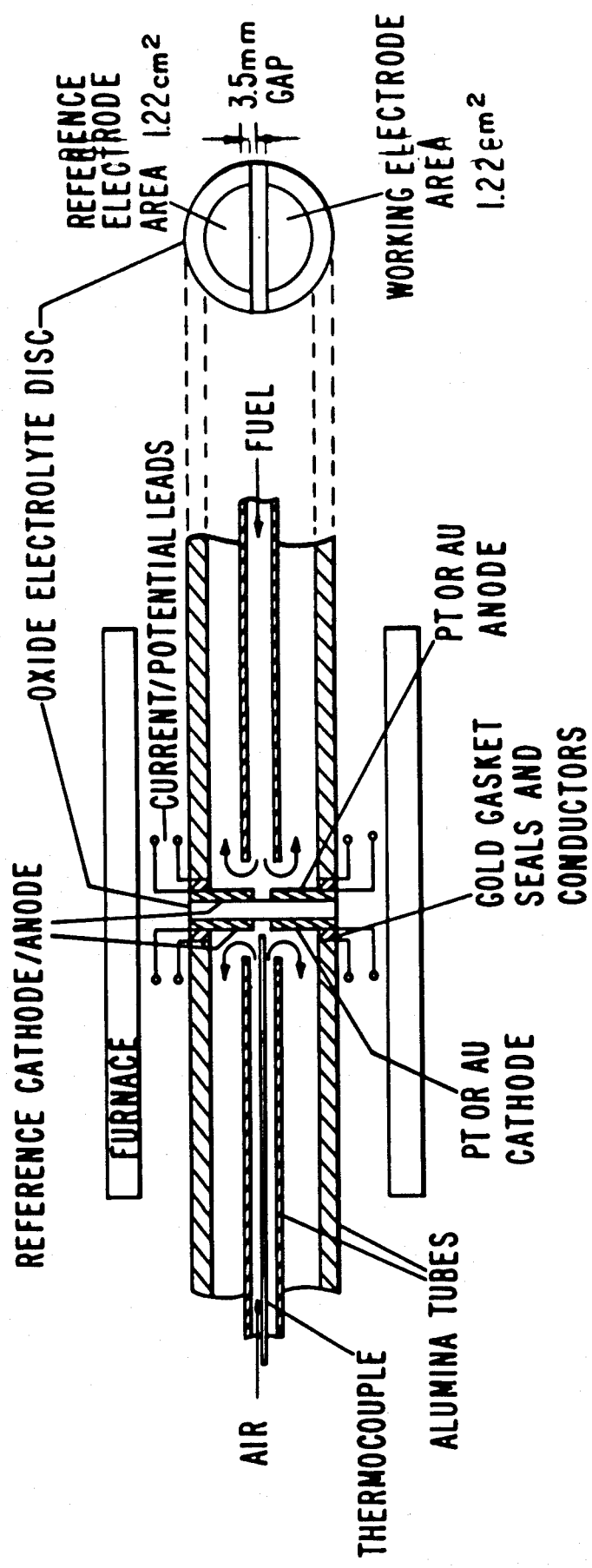
FIG. 1 is a schematic diagram of a solid electrolyte disc fuel-cell system.

Novel fuel cells are provided employing stabilized fluorite structured quadrivalent oxides as electrolytes, particularly zirconia and ceria stabilized by a variety of oxides such as yttria, scandia, gadolinia and bismuth oxide. The stabilizing oxide is normally present in an amount sufficient for mechanical stability, usually in from about 0.05 to 0.25 mole percent, more usually from about 0.05 to 0.20 mole percent. The stabilized quadrivalent oxides have a fluorite structure. These oxides provide high conductivities, at the elevated temperatures of fuel cell operation, generally 0.1 (ohm-cm)$^{-1}$ or greater. While the quadrivalent oxides are preferred as the oxygen ion electrolyte, other oxides may be used which allow for operation under analogous conditions to the oxides of the subject invention.

Desirably, the solid electrolyte employed in the fuel cells of this invention have blackened surfaces. The blackening of the electrolyte can be achieved by passing a current of 2 amps through the electrolyte layer for approximately one minute, first in one direction, then in the opposite direction. This procedure causes both sides of the layer to become blackened and is carried out repetitively, as required. During the blackening, the temperature will generally be in excess of 700° C., more usually in excess of 750° C. The conditions will be varied with varying electrolytes.

In the fuel cell, electrical contact may be made in a variety of ways with the electrolyte. Depending upon the form in which the electrolyte is employed, various electrically conducting metal films may be bound to the surface in porous form to allow for transmission of the fuels to the electrolyte surface. Alternatively, an ink may be painted onto the surface containing the conducting metal. Various metals may be used, such as platinum, gold, iron, chromium, or the like. It is not necessary that the electrode be catalytic, in view of the catalytic activity of the solid electrolyte.

The particular metallic conductor to be used as the electrode will be chosen to be stable at the conditions of operation. The electrode will be substantially inert to the fuel employed, so as to be capable of maintaining its electrical conductivity or, alternatively, will form an electrically conducting substantially inert product. The electrode should maintain its porosity to allow for flow of the fuel gases to the electrolyte. The same or different conducting surfaces can be employed for the different electrodes.

A wide variety of fuels may be used which are capable of accepting an oxygen atom and transferring electrons to the electrode. For the most part, the fuels will be either carbon and/or hydrogen-containing, such as hydrogen, hydrocarbons, normally from about 1 to 4 carbon atoms, more usually from about 1 to 2 carbon atoms, and partially oxidized carbon and hydrocarbon, such as carbonmonoxide, methanol, ethanol, and the like. That is the fuels will have for the most part H, C and O although other elements may be present e.g. nitrogen as in ammonia.

The fuel should be volatile at the temperature of operation of the fuel cell, should be unable to enter into reactions other than the desired reaction of acceptance of oxygen atoms, and from a practical point, should be relatively abundant and inexpensive. For the most part, the fuels employed in the fuel cells of this invention will be fuels derived from fossil fuels, such as natural gas, oil, shale oil, tar sands, water gas, and the like.

The counter electrode or cathode will be an oxygen electrode. The percent oxygen in the gas at the cathode may be varied widely, generally ranging from about 20% the concentration in air, and up to and include about 100%.

The products will normally be carbon dioxide and water. However, in some instances a fuel may be incompletely oxidized to produce a product of interest. For example, methanol could be used to make formaldehyde or formic acid.

The fuel cell will generally be operated at a temperature in excess of 600° C., usually in excess of 650° C., and normally below a temperature at which the various components of the fuel cell can fuse together. Usually, the temperature will be below 1,000° C., preferably below about 900° C. The pressure of the fuels at the electrodes may be varied widely, both as to partial pressure and total pressure. The partial pressure of the fuel may be as low as about 0.10 of an atm. and may be raised to 2 or 3 atm. or higher. The pressure which is chosen will be a function of the efficiency of oxidation of the fuel, the desired current, the presssure-efficiency profile of the cell at the particular temperature, and the like.

Another variable affecting the performance of the fuel cell will be the rate of flow. The rate of flow of the fuel can be varied widely, depending upon the rate of reaction of the fuel. Flow rates can vary from zero flow, usually a few cc/sec to $10^3$ cc/sec or higher.

As indicated, the particular pressure, temperature and flow rate will be a function of the fuel and the efficiency of the cell in response to these variables. Also to be considered are the cost of the fuel, the ability to purify and recycle the fuel, and other pragmatic considerations in providing an economical source of electricity.

Various configurations may be employed for the fuel cell. The electrolyte may be used as a sheet having an electrode on each surface, but preferably will be bound to a porous support. The support may take many different structures, such as tubes, sheets, particularly a plurality of parallel sheets, discs, test tube shape, etc. Conveniently, the electrolytes may be coated onto the porous support by a variety of techniques, conveniently plasma bonding. The support may be any convenient porous refractory material, e.g. a ceramic or cermet support, such as alumina, various metal nitrides and carbides, etc. The pore sizes of the support will be chosen to provide for a large surface area for the electrolyte and easy penetration of the fuel and oxygen to the electrolyte. Pore sizes may therefore vary from about $0.1\mu$ to $500\mu$. The electrode may then be applied to the electrolyte as described previously. The thickness of the electrolyte layer will generally be from about $0.01\mu$ to about $10\mu$, more usually from about $0.1\mu$ to $1\mu$.

In order to demonstrate the subject invention, an apparatus was developed as depicted in FIG. 1. Four similar semicircular paste electrodes, each with a working area of approximately 1.2 cm$^2$ were painted on an electrolyte disc of 8 mole percent $Sc_2O_3$-stabilized $ZrO_2$, 2.5 cm in diameter and approximately 1.5 mm thick. The electrode material used was either number 6926 unfluxed platinum ink or A-3156 unfluxed gold ink manufactured by Engelhard Industries. The disc was divided into two portions, the working electrodes comprising the lower semicircular portion of the disc separated by a 3.5 mm gap from the semicircular upper reference electrodes which operates at zero current. Two outer tubes having an O.D. equal to the diameter of the disc abutted the disc on opposite sides to provide a housing for the flow of gases.

A smaller tube without the outer housing extended almost to the surface of the disc on opposite sides of the disc providing for flow of fuel to the disc surface. The alumina tubular housing was surrounded by a furnace chamber for temperature control. Leads were provided for measuring current and potential from both the reference electrode and the working electrode. A thermocouple was included in the airstream to measure the temperature at the disc surface. Gasket seals and conductors were provided between the alumina tubular housing and the electrodes to prevent leakage.

The individual fuel gases reacted at the anode were hydrogen, carbon monoxide, methanol, ethanol, and methane. Helium saturated with either methanol or ethanol vapor at 25° C. provided these fuels at the anode. On the cathode side, air was used throughout the studies. The total gas pressure in every case was 1 atm. and the temperature ranged from 700°–850° C. Gas flow rates were kept at 75 ml/min with gases flowing normal to the disc in a stagnation flow configuration. Higher gas flow rates did not affect the current-potential curves indicating gas-diffusion was not influential.

Using the formula for the overpotential $\eta$ (defined as positive):

$$\eta = V - 0.5\, IR_{ac} - V_o$$

where $V$ and $V_o$ are the potential difference between the working and reference electrodes at current I and at 0 current, respectively. The current was determined at various overpotentials for hydrogen and carbon monoxide. Typically, $V_o$ is the open circuit potential and $IR_{ac}$ is the electrolyte ohmic drop across the whole cell, $R_{ac}$ being measured at 1 kHz with an impedance bridge. When the maximum current under the fuel-cell mode of operation is obtained (self-generated potential approaching 0), an external power supply has to be applied to obtain higher currents.

In FIG. 2, it is seen that with both hydrogen and carbon monoxide, substantial currents can be achieved at increasing overpotentials with either platinum or gold porous electrodes employing unblackened electrolyte.

In FIG. 3, the current versus overpotential is shown for an air-carbon monoxide fuel cell anode operating at 1 atm. using platinum or gold porous electrodes with the electrolyte in a blackened state. Comparison of the results of the blackened electrolyte with the unblackened results of FIG. 2 demonstrate the superiority of the blackened electrolyte.

Various configurations can be employed in developing a fuel cell for commercial uses. For example, tubes may be coated with the electrolyte by plasma techniques to provide for a fine coating of the electrolyte internal to the tube and external to the tube. The tube would be a porous tube, where the oxygen could flow internal to the tube and the fuel external to the tube. The electrolyte would be coated with an appropriate conductive metal coating to provide for transfer of electricity. Grooves in the electrolyte are provided so as to isolate areas of the electrodes to provide individual cells. Rings or interconnectors can be placed in the spaces in electrical contact with the coatings. Leads bonded to the rings would serve for the transmission of the generated current. Other configurations may also find use.

In accordance with the subject invention, fuel cells are provided having desirable properties in allowing for operation at temperatures substantially below 1,000° C. Because of the operation below 1,000° C., the nature of the materials which are used is not as critical, since diffusion of one material into another is not observed. In addition, the fuel cells operate at high efficiency and appear to act as catalysts in catalyzing the reaction between the fuel and oxygen. Therefore, catalytic metals are not required, which are expensive and may have relatively short lifetimes. Furthermore, the low resistance which is observed with the subject electrolytes permits efficient current production.

Although the foregoing invention has been described in some detail by way of illustration and example for purposes of clarity of understanding, it will be obvious that certain changes and modifications may be practiced within the scope of the appended claims.

What is claimed is:

1. A method of producing electicity with a fuel cell having first and second electrodes in electrical contact with a solid stabilized fluorite metal oxide electrolyte wherein said electrodes are non-catalytic, said method comprising contacting a first porous anode electrode with a fuel capable of being oxidized and a second porous cathode electrode with oxygen at a temperature below 1,000° C.; and drawing electrical current from said electrodes.

2. A method according to claim 1, wherein said temperature is in the range of about 700° to 850° C.

3. A method according to claim 1, wherein said electrolyte is a stabilized zirconia.

4. A method according to claim 3, wherein said zirconia is yttria-stabilized zirconia.

5. A method according to claim 3, wherein said stabilized zirconia is scandia-stabilized zirconia.

6. A method according to any of claims 1, 2 or 3, wherein said fuel contains hydrogen or carbon in an oxidizable state.

7. A method according to claim 1, wherein said fuel is incompletely oxidized to produce a useful product, and including the additional step of isolating said product.

8. A method for producing electricity from a fuel cell, employing as a fuel cell a stabilized zirconia electrolyte having an inert electrically conducting metal coated on each of its sides to provide an anode and a cathode wherein said metal is non-catalytic, said method comprising:

feeding a hydrogen or carbon-containing fuel in an oxidizable state to said porous anode and oxygen to said porous cathode at a temperature in the range of about 700° to about 850° C.; and drawing electrical current from said electrodes.

9. A method according to claim 8, wherein said stabilized electrolyte is yttria-stabilized zirconia.

10. A method according to claim 8, wherein said stabilized zirconia is scandia-stabilized zirconia.

11. A method according to claim 8, wherein the surface of said electrolyte is blackened.

12. A method of producing electricity with a fuel cell having first and second electrodes in electrical contact with a solid stabilized fluorite metal oxide electrolyte blackened on at least one side, said method comprising:

contacting a first porous anode electrode with a fuel capable of being oxidized and a second porous cathode electrode with oxygen at a temperature below 1000° C.; and drawing electrical current from said electrodes.

13. A method according to claim 12, wherein said electrolyte is a stabilized zirconia.

14. A method according to claim 13, wherein said stabilized zirconia is an yttria or scandia stabilized zirconia.

* * * * *

UNITED STATES PATENT AND TRADEMARK OFFICE
CERTIFICATE OF CORRECTION

PATENT NO. : 4,459,340
DATED : July 10, 1984
INVENTOR(S) : DAVID M. MASON

It is certified that error appears in the above-indentified patent and that said Letters Patent is hereby corrected as shown below:

Column 1, line 2, insert the following:

--This invention was made with Government support under contract DE-AT03-79ER10492 awarded by the Department of Energy. The Government has certain rights in this invention.--

Signed and Sealed this

Twenty-first Day of February, 1995

Attest:

BRUCE LEHMAN

Attesting Officer

Commissioner of Patents and Trademarks